(12) United States Patent
Shihara et al.

(10) Patent No.: US 6,381,201 B1
(45) Date of Patent: Apr. 30, 2002

(54) OPTICAL DISK APPARATUS WITH ADDRESS POLARITY DETERMINATION AND CONFIRMATION

(75) Inventors: Tetsuya Shihara, Osaka; Katsuya Watanabe, Nara; Naohiro Kimura, Kyoto; Hidemi Takahashi, Osaka, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/427,650

(22) Filed: Oct. 27, 1999

(30) Foreign Application Priority Data

Oct. 30, 1998 (JP) .......................................... 10-310025

(51) Int. Cl.[7] .............................................. G11B 17/22
(52) U.S. Cl. ....................................................... 369/32
(58) Field of Search .......................... 369/275.3, 53.41, 369/44.26, 275.2, 32, 47.1, 53.44

(56) References Cited

U.S. PATENT DOCUMENTS

| | | | | |
|---|---|---|---|---|
| 5,872,767 A | * | 2/1999 | Nagai et al. ............. | 369/275.3 |
| 6,044,051 A | * | 3/2000 | Miyagawa et al. ........... | 369/47 |
| 6,058,099 A | * | 5/2000 | Senshu .................... | 369/275.3 |
| 6,172,960 B1 | * | 1/2001 | Takemura et al. ....... | 369/275.3 |

OTHER PUBLICATIONS

T. Nagai et al., Japanese Publication for Opposition; No. 2788789, Published Jun. 5, 1998.

* cited by examiner

*Primary Examiner*—Tan Dinh
(74) *Attorney, Agent, or Firm*—Renner, Otto, Boisselle & Sklar

(57) ABSTRACT

An optical disk apparatus of the present invention includes: a light amount detection section for irradiating an information carrier with a light beam so as to detect information recorded in a data section of the information carrier, wherein the information carrier includes the data section and an address section associated with the data section, the data section is an information track formed by a land or a groove where information can be recorded or reproduced, and the address section contains address information corresponding to the information track which is recorded in the address section by one or more concave or convex pit offset by a predetermined distance from a center of the information track; an address polarity determination section for determining whether the address section over which the light beam has passed is either on an outer periphery side or on an inner periphery side with respect to the center of the information track being scanned by the light beam, based on a signal output from the light amount detection section; an address reproduction section for reproducing the address information recorded in the address section based on a signal output from the light amount detection section; and an address confirmation section for confirming the data section from which or to which data is to be reproduced or recorded, based on the determination result from the address polarity determination section and the address information reproduced by the address reproduction section.

4 Claims, 14 Drawing Sheets

Enlarged portion

OPTICAL DISK APPARATUS WITH ADDRESS POLARITY DETERMINATION AND CONFIRMATION

BACKGROUND OF THE INVENTION

1. Field of the Invention

The present invention relates to an optical disk apparatus for optically reproducing/recording a signal from/to an information carrier using an light beam from a light source such as a semiconductor laser. More particularly, the present invention relates to an optical disk apparatus for reproducing/recording a signal from/to a recordable disk having address sections which are wobbled about a track.

2. Description of the Related Art

An information carrier (optical disk) such as CD-AUDIO, CD-ROM, DVD-VIDEO and DVD-ROM contains information recorded thereon as concave/convex pits arranged along a single spiral track which spirally runs from the inner periphery of the disk to the outer periphery thereof.

In order to properly reproduce a signal on the track, a conventional optical disk apparatus typically performs the following control operations: a rotation control for rotating the optical disk at a predetermined number of revolutions: a focusing control such that the optical disk is irradiated with a light beam having a predetermined focused state; and a tracking control such that the light beam properly scans along the track of the optical disk.

Recent development in the high-density optical disk technology has seen the advent of a recordable optical disk "DVD-RAM" (digital versatile disk-random access memory).

Such a recordable DVD-RAM includes address sections as well as data sections where data can be recorded. Such a recordable optical disk is divided into a plurality of concentric zones which are successively arranged from the inner periphery of the optical disk to the outer periphery thereof. Each data section includes a guide groove (or a groove track) and a land track between two adjacent groove tracks.

FIG. 11 illustrates a portion of a recordable optical disk. Referring to FIG. 11, each data section includes a concave groove track 207 and a convex land track 206. A single pair of the groove track 207 and the land track 206 runs in a spiral pattern across the optical disk. An address section 205 is provided to interrupt the extent of the pair of the groove track 207 and the land track 206 along a boundary between the tracks 206 and 207. An actual beam spot on the optical disk is larger than the width of the track 206 or 207. Therefore, as the light beam moves along the groove track 206 or the land track 207, the beam can read an address in the address section 205 which is arranged along a boundary between the tracks 206 and 207.

An address 210, for example, is formed along a boundary between a track 209 and a track 202. Similarly, addresses 201 and 204 are formed respectively along a boundary between tracks 202 and 203 and along a boundary between tracks 203 and 208. Thus, a groove track and an adjacent land track share an address.

The track 202 is defined by the addresses 210 and 201. Similarly, the track 203 is defined by the addresses 201 and 204. These addresses are searched when recording data along a predetermined track or when reproducing the recorded data therefrom.

A spiral track formed by a string of pits (as in conventional CDs and DVD-ROMs) is not divided into zones. For such a spiral track, data is recorded from the inner periphery to the outer periphery at a constant linear velocity (i.e., at a constant recording density). In such a disk, as long as the CLV (constant linear velocity) control is properly performed, a PLL (phase locked loop) is pulled-in so that an address or data can successfully be reproduced.

In an optical disk such as a DVD-RAM, on the other hand, the data region is formed by land and groove tracks and is divided into zones, The zones have different numbers of revolutions and different PLL target clock frequencies, respectively. Thus, it is necessary to know which zone is being reproduced/recorded.

Typically, a stepping motor, an encoder, or the like, is used in an optical head traverse drive system of an optical disk recording apparatus. For example, an encoder can be used to implement a system capable of detecting the zone where the light beam is currently located. In such a case, a traverse control may be performed based on a pulse signal from the encoder, while using a pulse signal value for the innermost position of the disk as the initial value.

However, in view of improving the precision and reducing the cost, there is a demand in the art for the use of an inexpensive and simpler DC motor.

When reproducing a DVD-RAM disk with the above-described conventional optical disk apparatus, a single track (either a land or a groove) is identified by a pair of addresses along the opposite sides of the track. If, for example, there is a speck of dust in the address section of the address 210 or if a lens shift occurs to displace the light beam in the direction indicated by an arrow N in FIG. 11, the address 210 may not be properly read when the light beam is scanning along the track 202. In such a case. It is not possible to determine whether the current track is the track 202 or the track 203 based only on the address 201, whereby a data reproduction/recording operation cannot be performed properly.

Moreover, with the conventional optical disk apparatus, the position of the light beam cannot be known immediately after the initialization of the apparatus. The zone where the light beam is currently located is identified only after an address is successfully reproduced by successively switching among the numbers of revolutions and the PLL target frequencies for the respective zones. Thus, such a conventional apparatus has an undesirably long start-up time.

SUMMARY OF THE INVENTION

According to one aspect of this invention, an optical disk apparatus includes: a light amount detection section for irradiating an information carrier with a light beam so as to detect information recorded in a data section of the information carrier, wherein the information carrier includes the data section and an address section associated with the data section, the data section is an information track formed by a land or a groove where information can be recorded or reproduced, and the address section contains address information corresponding to the information track which is recorded in the address section by one or more concave or convex pit offset by a predetermined distance from a center of the information track; an address polarity determination section for determining whether the address section over which the light beam has passed is either on an outer periphery side or on an inner periphery side with respect to the center of the information track being scanned by the light beam, based on a signal output from the light amount detection section: an address reproduction section for reproducing the address information recorded in the address section based on a signal output from the light amount detection section: and an address confirmation section for confirming the data section from which or to which data is to be reproduced or recorded, based on the determination result from the address polarity determination section and the address information reproduced by the address reproduction section.

In one embodiment of the invention, the address section includes two or more address regions where the address information is recorded. The address regions are wobbled by a predetermined distance about the center of the information track. The address region is shared by a pair of adjacent information tracks.

According to another aspect of this invention, an optical disk apparatus includes: a light amount detection section for irradiating an information carrier with a light beam so as to detect information recorded in a data section of the information carrier, wherein the information carrier includes the data section and an address section associated with the data section, the data section is an information track formed by a land or a groove where information can be recorded or reproduced, and the address section contains address information corresponding to the information track which is recorded in the address section by one or more concave or convex pit offset by a predetermined distance from a center of the information track; an address section detection section for detecting that the light beam is on the address section based on an output from the light amount detection section; a pulse interval measurement section for measuring an interval between the address sections based on an output from the address section detection section; a radial position estimate section for estimating a radial position of the light beam based on the measurement result from the pulse interval measurement section; and a clock generation section for generating a reproduction clock based on the radial position of the light beam estimated by the radial position estimate section.

In one embodiment of the invention, the optical disk apparatus further includes a tracking error detection section for detecting an amount of tracking error of the light beam passing over the address section. The address section detection section includes a digitization section for digitizing an output from the tracking error detection section. The pulse interval measurement section measures the interval between pulses output from the digitization section. The radial position estimate section estimates the radial position of the light beam based on a time required for one revolution of the information carrier and an output from the pulse interval measurement section.

In one embodiment of the invention, the optical disk apparatus further includes: a tracking error detection section for detecting an amount of tracking error of the light beam passing over the address section; a maximum value measurement section for measuring a maximum value of an output signal from the tracking error detection section for a predetermined period of time; and a minimum value measurement section for measuring a minimum value of the output signal from the tracking error detection section for a predetermined period of time. The address section detection section further includes: a digitization section for digitizing the output from the tracking error detection section; and a threshold value setting section for setting a threshold value which is used when digitizing the output from the tracking error detection section, the threshold value being obtained based on the maximum value and the minimum value.

In one embodiment of the invention, the optical disk apparatus further includes: a tracking error detection section for detecting an amount of tracking error of the light beam passing over the address section: a maximum value measurement section for measuring a maximum value of an output signal from the tracking error detection section for a predetermined period of time; a minimum value measurement section for measuring a minimum value of the output signal from the tracking error detection section for a predetermined period of time; and an average value measurement section for measuring an average value of the output signal from the tracking error detection section for a predetermined period of time. The address section detection section further includes: a digitization section for digitizing the output from the tracking error detection section; and a threshold value setting section for setting a threshold value which is used when digitizing the output from the tracking error detection section, the threshold value being obtained based on the maximum value and the average value or based on the minimum value and the average value.

In one embodiment of the invention, the optical disk apparatus further includes: a tracking error detection section for detecting an amount of tracking error of the light beam passing over the address section: a maximum value measurement section for measuring a maximum value of an output signal from the tracking error detection section for a predetermined period of time; and an amplitude absolute value conversion section for obtaining an absolute value of an amplitude of the output signal from the tracking error detection section. The address section detection section further includes: a digitization section for digitizing the output from the tracking error detection section; and a threshold value setting section for setting a threshold value- which is used when digitizing the output from the tracking error detection section, the threshold value being obtained based on the maximum value and the average value.

In one embodiment of the invention, the pulse interval measurement section measures the interval between the pulses output from the digitization section while ignoring a latter one of pulses which are successively output within a period of time which is shorter than a predetermined period of time.

In one embodiment of the invention, the optical disk apparatus further includes: a tracking control section for controlling the light beam so that the light beam scans along the information track on the information carrier; and an abnormal track jump detection section for detecting that the light beam is scanning off the track. The optical disk apparatus inactivates the pulse interval measurement section based on the detection result from the abnormal track jump detection section.

In one embodiment of the invention, the optical disk apparatus further includes a focusing control section for controlling the light beam so that the light beam is focused on the information carrier in a predetermined focused state. The optical disk apparatus inactivates the pulse interval measurement section when the focused state of the light beam on the information carrier is substantially different from the predetermined focused state or when the focusing control section is inactive.

According to still another aspect of this invention, an optical disk apparatus includes: a light amount detection section for irradiating an information carrier with a light beam so as to detect information recorded in a data Section of the information carrier, wherein the information carrier includes the data section and an address section associated with the data section, the data section is an information track formed by a land or a groove where information can be recorded or reproduced, and the address section contains address information corresponding to the information track which is recorded in the address section by one or more concave or convex pit offset by a predetermined distance from a center of the information track; an address section detection section for detecting that the light beam is on the address section based on an output from the light amount detection section; a pulse counter section for counting the number of signals which are output from the address section detection section within a predetermined period of time; a radial position estimate section for estimating a radial position of the light beam with respect to the information carrier, based on an output from the pulse counter section; and a clock setting section for activating the radial position estimate section when the address information cannot be reproduced and setting a reproduction clock based on the estimated radial position of the light beam.

In one embodiment of the invention, the optical disk apparatus further includes a tracking error detection section for detecting an amount of tracking error of the light beam passing over the address section. The address section detection section further includes a digitization section for digitizing an output from the tracking error detection section. The pulse counter section counts the number of digitized pulses output from the digitization section. The radial position estimate section estimates the radial position of the light beam based on a time required for one revolution of the information carrier and an output from the pulse counter section.

In one embodiment of the invention, the optical disk apparatus further includes: a focusing control section for controlling the light beam so that the light beam is focused on the information carrier in a predetermined focused state; and a control state determination section for determining whether the focusing control section is properly operating. The optical disk apparatus ignores an output from the pulse counter section based on the determination result from the control state determination.

In one embodiment of the invention, the light amount detection section detects the information recorded on the information track based on the light beam having been reflected by the information carrier.

In one embodiment of the invention, the light amount detection section detects the information recorded on the information track based on the light beam having passed through the information carrier.

Thus, the invention described herein makes possible the advantages of (1) providing an optical disk apparatus with which it is possible to identify a predetermined track and to reproduce/record data from/to the track even if one of a pair of addresses cannot be reproduced because of a speck of dust in the address section or a lens shift; (2) providing an optical disk apparatus with which the first address after a start-up or a restart of the apparatus can be reproduced within a reduced amount of time by estimating a current position (zone) of the light beam upon the start-up or the restart; and (3) providing an optical disk apparatus which is inexpensive to implement and can be reliably used with an optical disk which is divided into zones.

These and other advantages of the present invention will become apparent to those skilled in the art upon reading and understanding the following detailed description with reference to the accompanying figures.

Figure 7A:
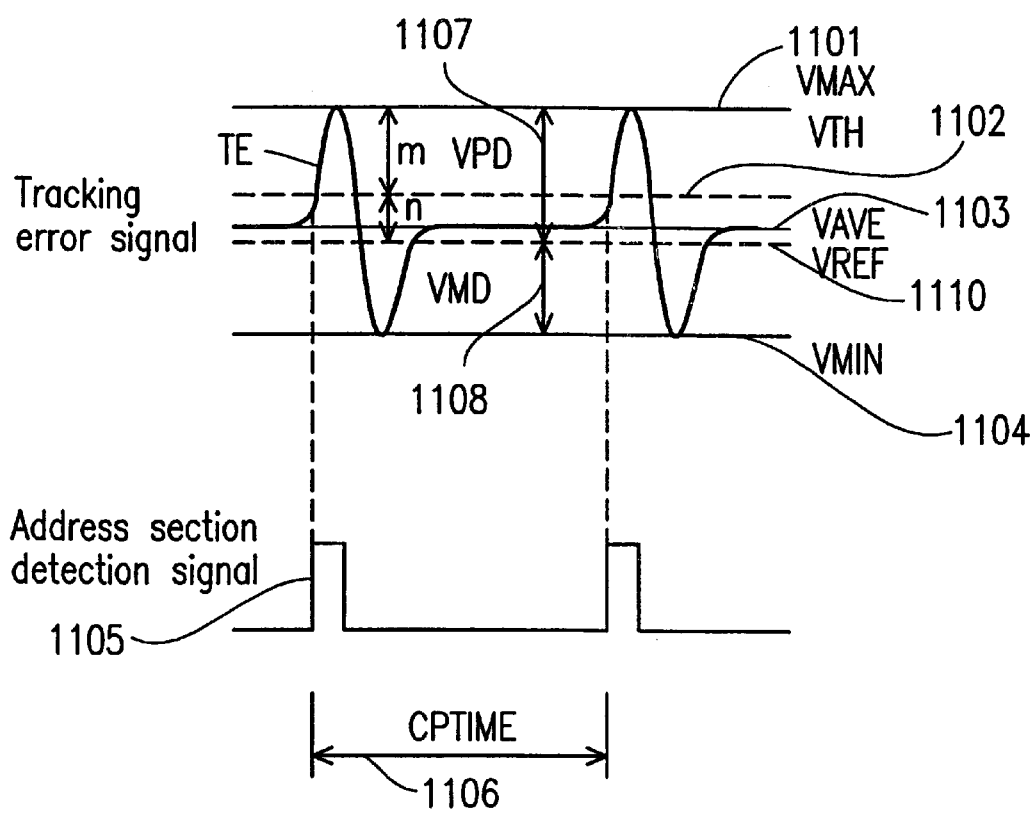
Figure 7B:
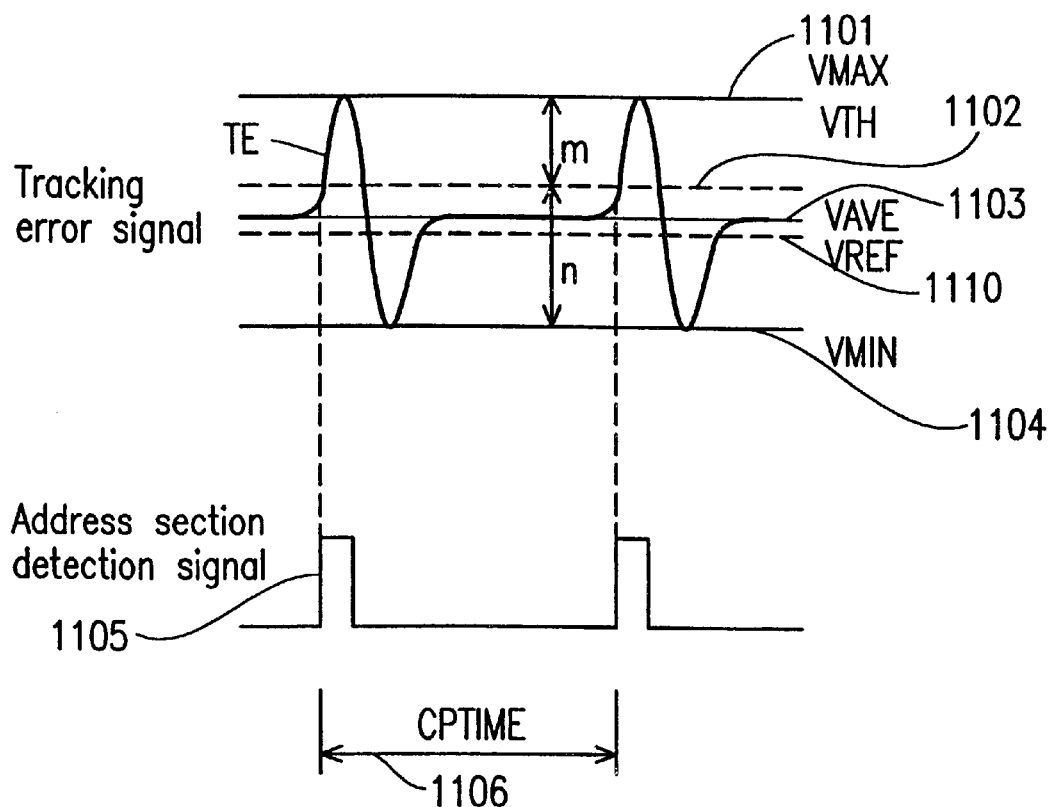
Figure 7C:
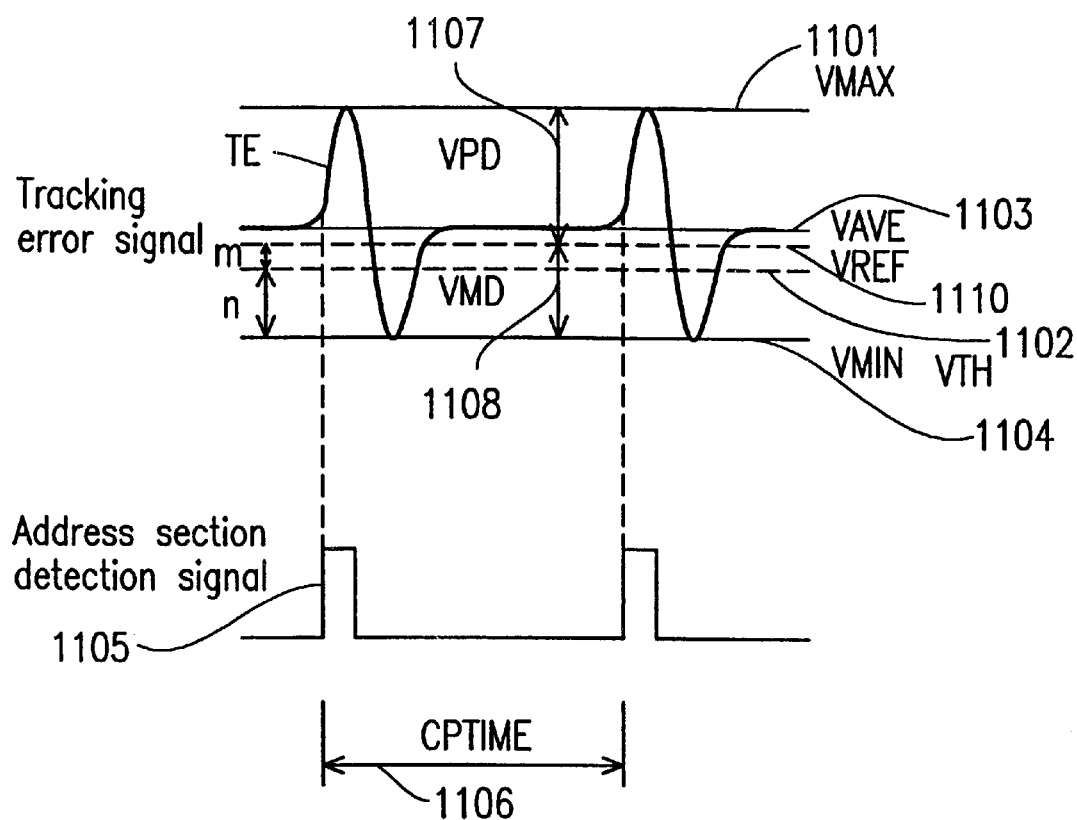
Figure 8A:
Figure 8B:
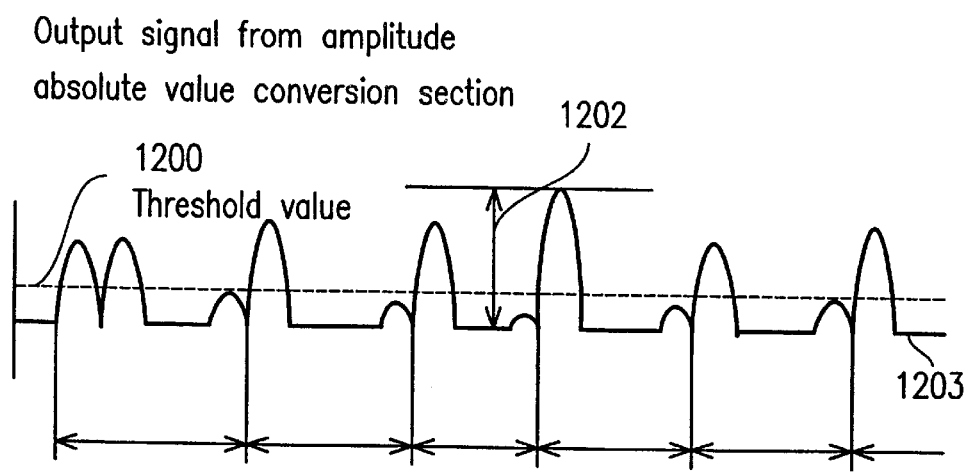
Figure 9:
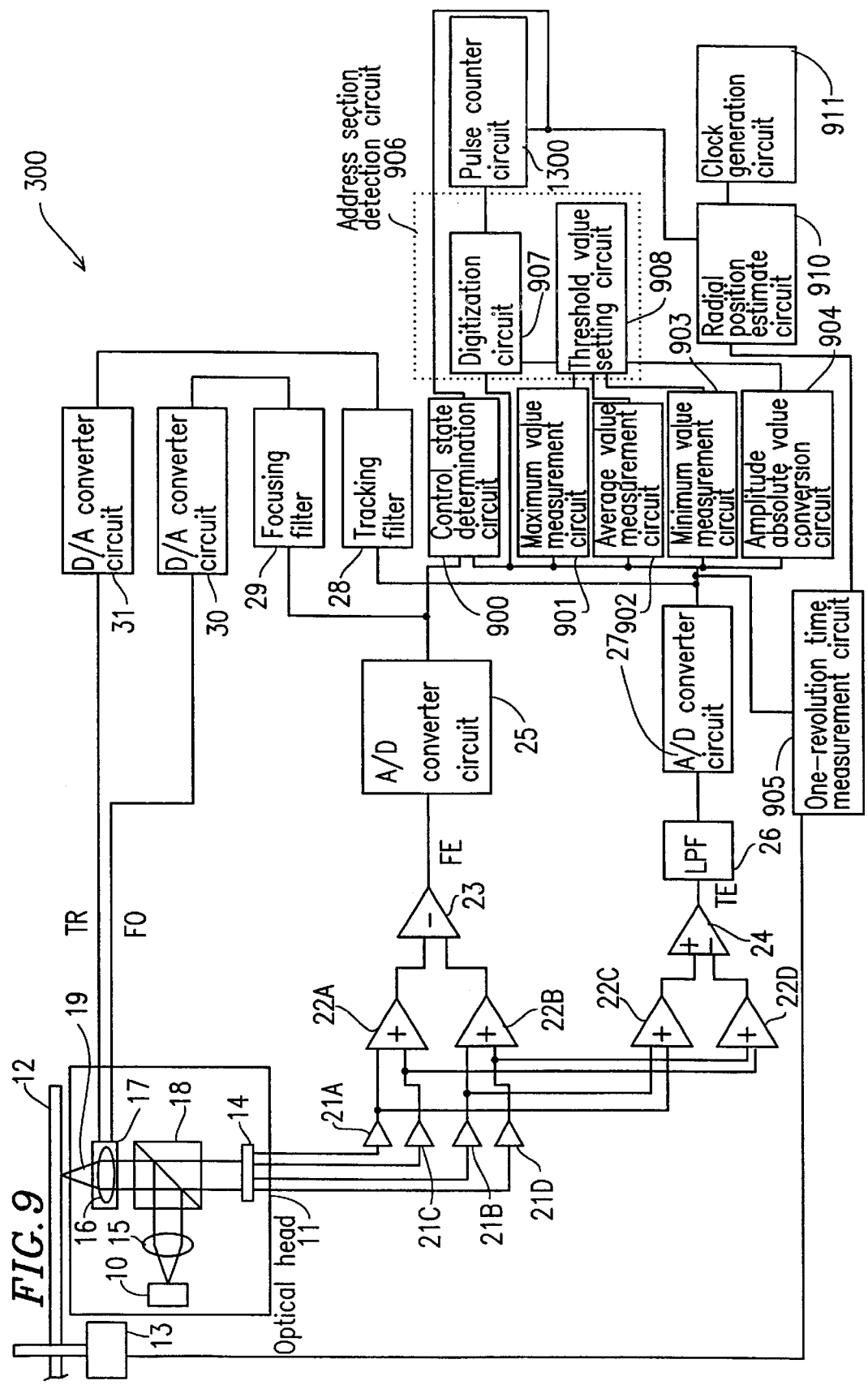
Figure 10:
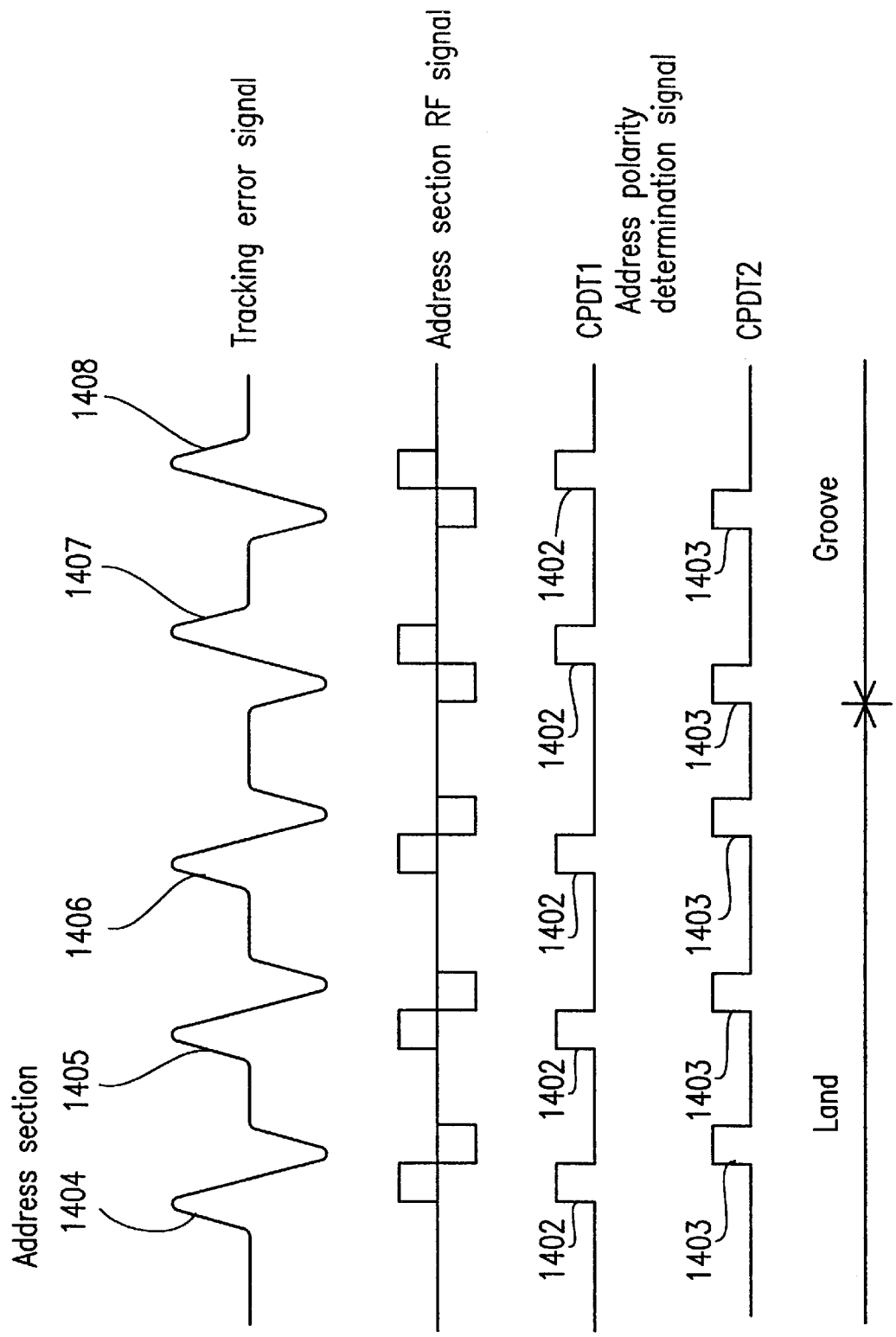
Figure 11:
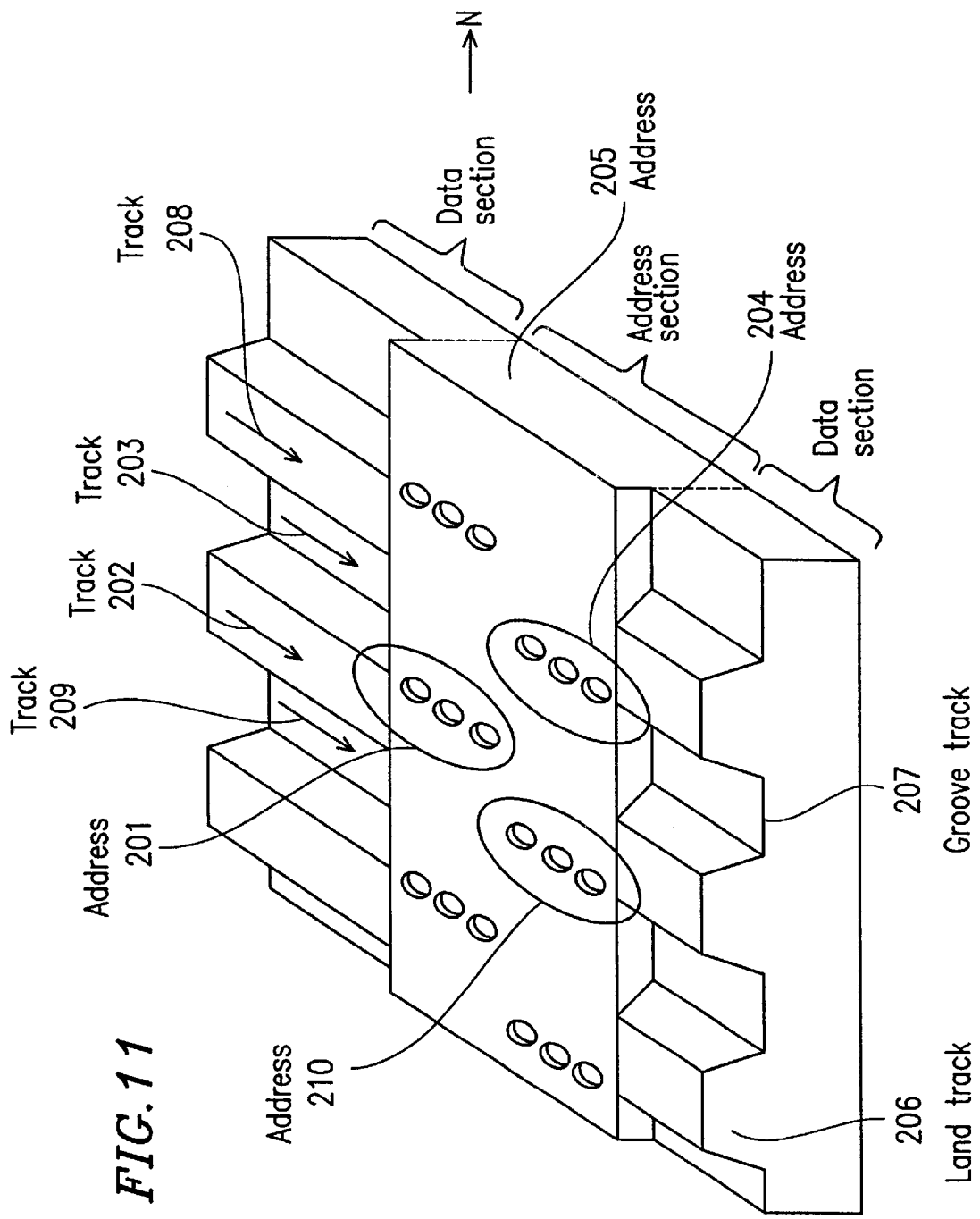

Each of FIGS. 7A to 7C is a schematic diagram illustrating the relationship between a tracking error signal and an address detection signal;

FIG. 8A is a waveform diagram illustrating an operation of an amplitude absolute value conversion circuit;

FIG. 8B is a waveform diagram illustrating an operation of an amplitude absolute value conversion circuit FIG. 9 is a block diagram illustrating an optical disk apparatus according to Example 3 of the present invention;

FIG. 10 is a waveform diagram illustrating a tracking error signal at a land/groove switch section according to Example 3 of the present invention: and FIG. 11 is a schematic diagram illustrating an arrangement of address sections and a track on an optical disk.

DESCRIPTION OF THE PREFERRED EMBODIMENTS

Embodiments of the present invention will now be described with reference to the accompanying figures, in which like reference numerals denote like components.

EXAMPLE 1

Figure 1:
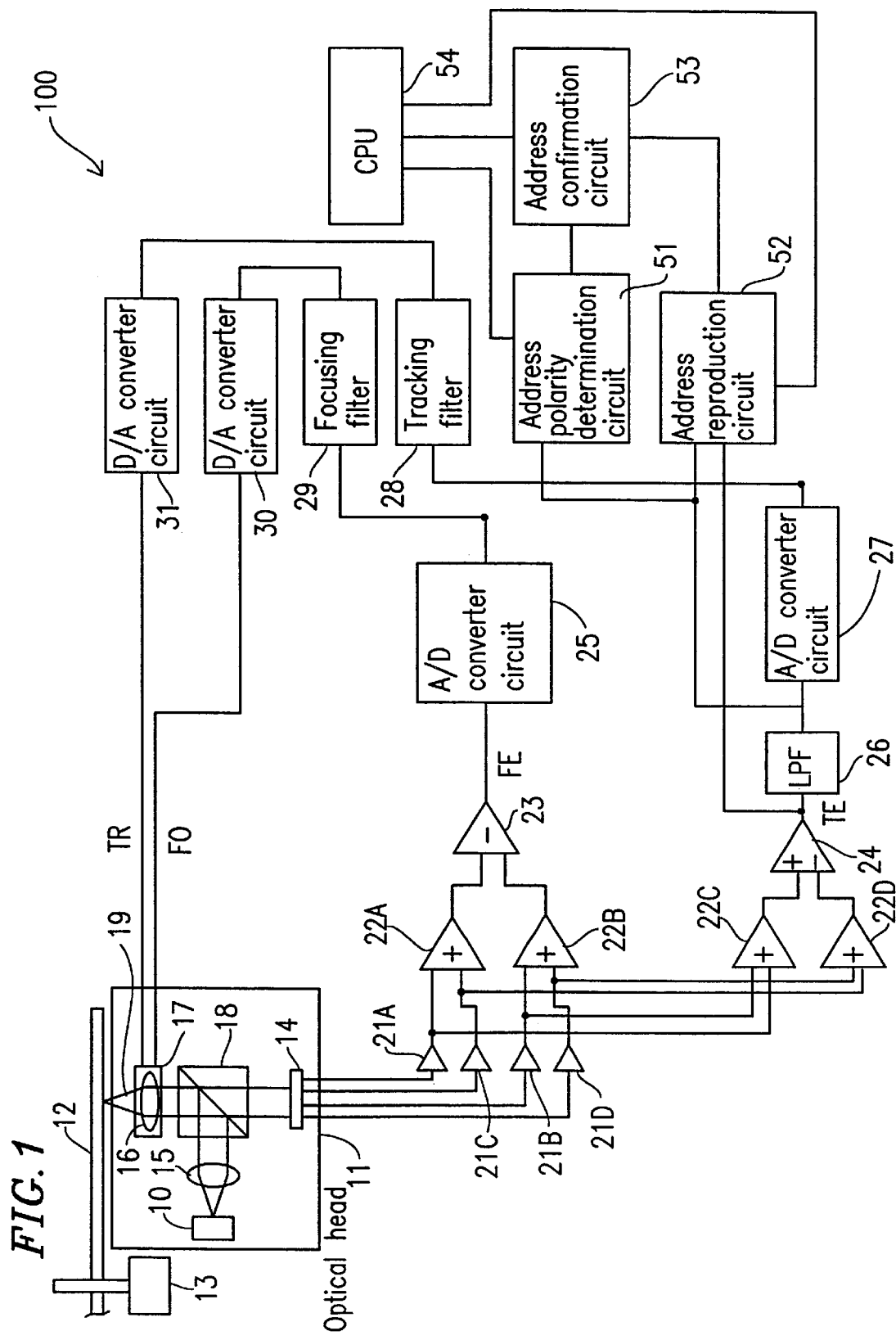
FIG. 1 is a block diagram illustrating an optical disk apparatus according to Example 1 of the present invention.

FIG. 1 is a block diagram illustrating an optical disk apparatus 100 for reproducing/recording data from/to a recordable optical disk according to Example 1 of the present invention.

Referring to FIG. 1, the optical disk apparatus 100 includes an optical head 11. The optical head 11 includes a semiconductor laser light source 10 for irradiating an optical disk 12 with a light beam 19, a coupling lens 15 for collimating light output from the semiconductor laser light source 10, a converging lens 16, an actuator 17, a 4-divided photodetector 14 and a polarization beam splitter 18.

A light beam output from the semiconductor laser light source 10 is collimated by the coupling lens 15. Then, the collimated light passes through the polarization beam splitter 18 and is converged by the converging lens 16 which is moved by the actuator 17 in the focusing direction and in the tracking direction. Thus, the light beam 19 forms a beam spot on the disk 12.

The 4-divided photodetector 14 provided in the optical head 11 of the optical disk apparatus 100 is an element for receiving reflected light from the disk 12. The reflected light from the disk 12 passes through the converging lens 16 and the polarization beam splitter 18 and then is incident upon the 4-divided photodetector 14.

Figure 2:
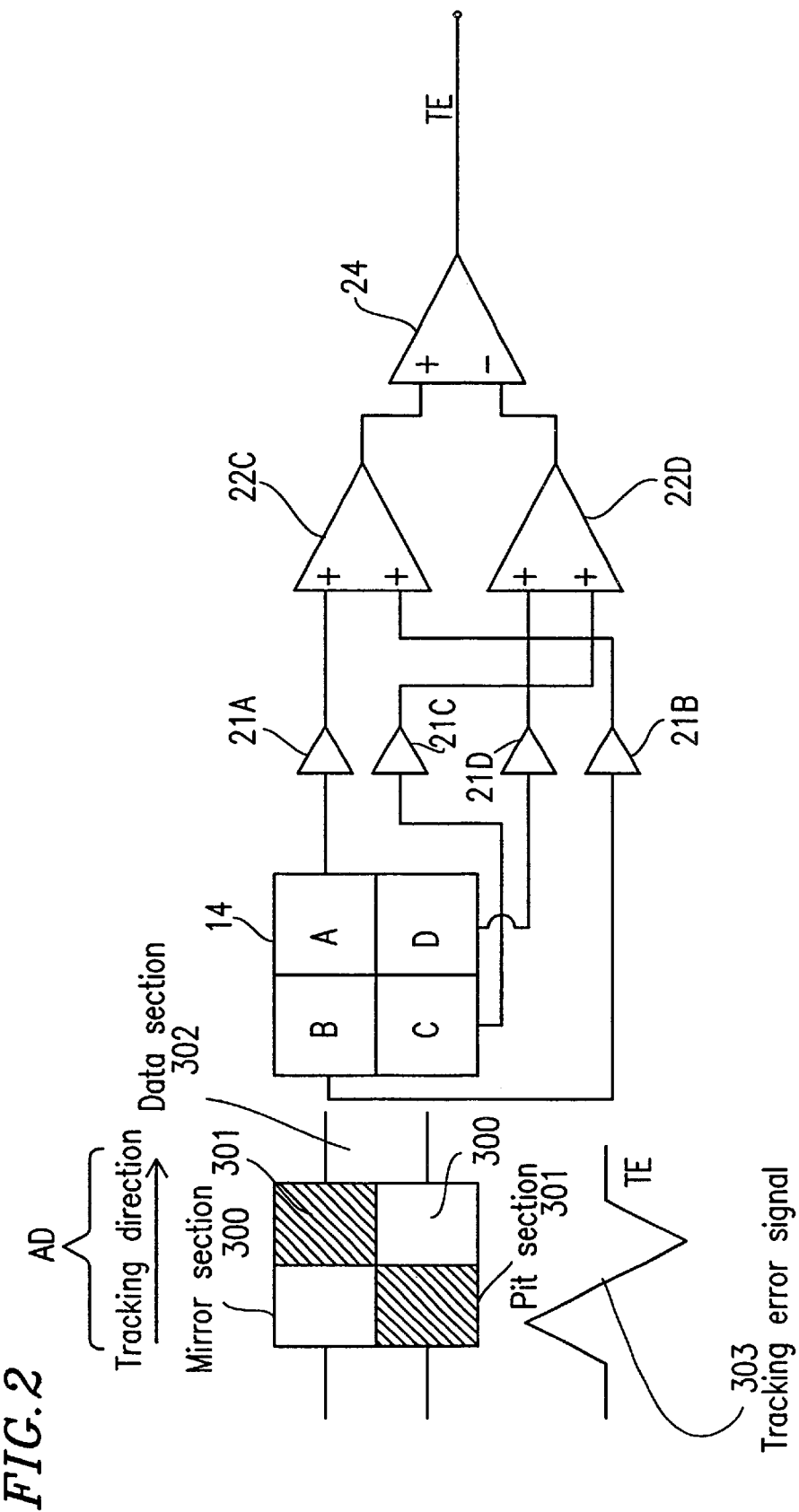
FIG. 2 is a block diagram illustrating a photodetector of the optical disk apparatus of Example 1 in greater detail.

As illustrated in FIG. 2, the 4-divided photodetector 14 is divided into four regions A to D. A focusing error signal FE and a tracking error signal TE are obtained based on the signals from the regions A to D.

Referring to FIGS. 1 and 2, the tracking error signal TE is obtained by adding together the respective outputs from current-voltage conversion amplifiers 21A and 21B by an adder 22C, adding together the respective outputs from current-voltage conversion amplifiers 21C and 21D by an adder 22D, and then obtaining a difference between the respective outputs from the adders 22C and 22D by a differential amplifier 24.

Referring to FIG. 1, the focus in error signal FE is obtained by adding together the respective outputs from the current-voltage conversion amplifiers 21A and 21C by an adder 22A, adding together the respective outputs from the current-voltage conversion amplifiers 21B and 21D by an adder 22B, and then obtaining a difference between the respective outputs from the adders 22A and 22B by a differential amplifier 23.

The focusing error signal FE is converted to a digital signal through an A/D converter circuit 25, and then input to a focusing filter 29 which may be implemented with a digital signal processor, or the like. The focusing control is performed by controlling the actuator 17 via a D/A converter circuit 30 based on the output from the focusing filter 29.

Noise is removed from the tracking error signal TE as the tracking error signal TE passes through a low pass filter (LPF) 26. The tracking error signal TE is converted to a digital signal through an A/D converter circuit 27, and then input to a tracking filter 28 which may be implemented with a digital signal processor, or the like. The tracking control is performed by controlling the actuator 17 via a D/A converter circuit 31 based on the output from the tracking filter 28.

The optical head 11 and the current-voltage conversion amplifiers 21A to 21D together form a light amount detection section.

Next, a method and apparatus-for reproducing an address according to the present invention will be described with reference to FIGS. 2, 3A and 3B.

FIG. 2 illustrates the 4-divided photodetector 14 in detail. FIG. 2 also illustrates an arrangement of mirror sections 300 and pit sections 301 in an address section AD on an optical disk, with a data section 302 extending from each side of the address section AD. FIG. 2 further illustrates a tracking error signal TR 303 being obtained as the light beam moves along the address section AD.

Figure 3A:
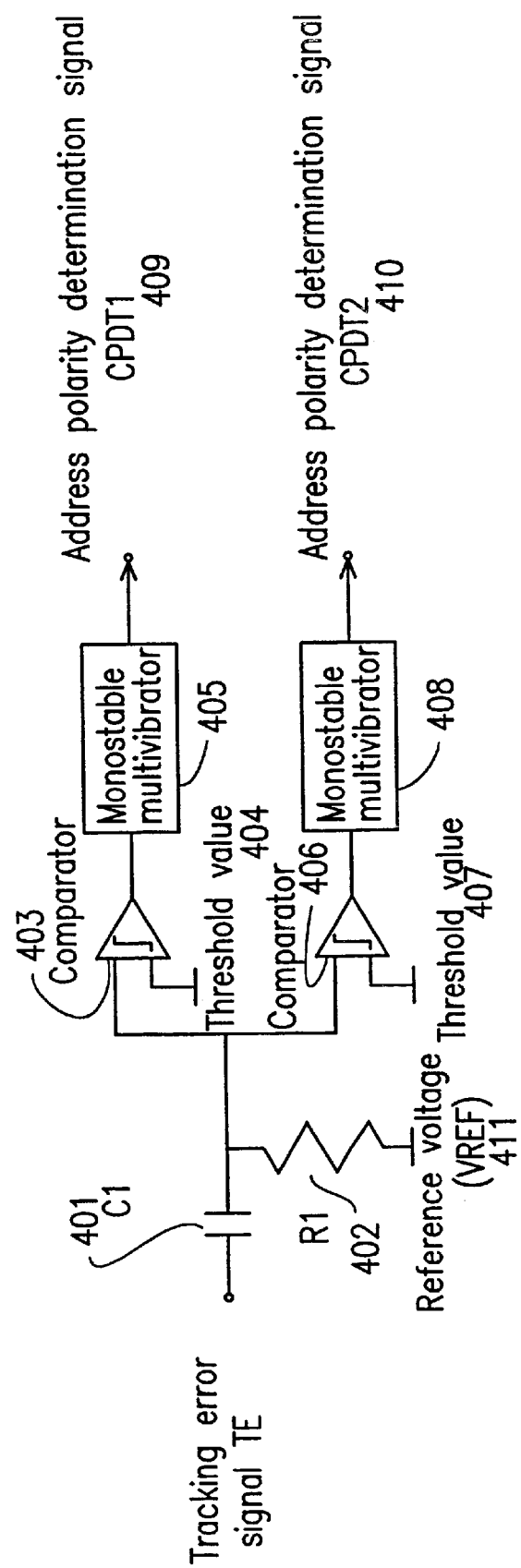
FIG. 3A is a block diagram illustrating an address polarity determination circuit according to Example 1 of the present invention.
Figure 3B:
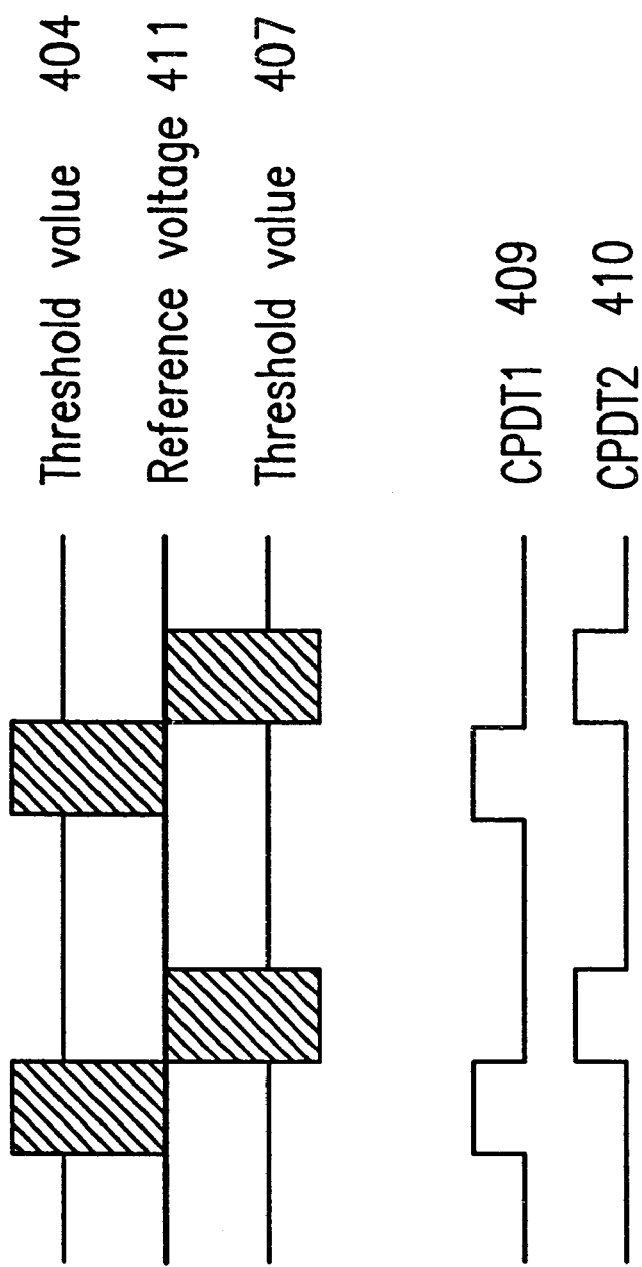
FIG. 3B is a diagram illustrating an address polarity determination signal according to Example 1 of the present invention.

FIG. 3A is a block diagram illustrating an address polarity determination circuit 61 for detecting an address polarity determination signal to reproduce an address.

The tracking error signal TE 303 is obtained based on signals detected by the 4-divided photodetector 14 as illustrated in FIG. 2. Then, the tracking error signal TE 303 passes through a high pass filter which may be implemented with a condenser 401 and a resister 402. The DC level of the tracking error signal TE is converted so that the tracking error signal TE is symmetrically centered about a reference voltage 411, as illustrated in FIG. 3B.

Comparators 403 and 406 obtain respective pulse trains by digitizing the tracking error signal TE. The comparators 403 and 406 send the pulse trains to monostable multivibrators 405 and 408, respectively, thereby producing address polarity determination signals 409 and 410, respectively.

Threshold values 404 and 407 are preferably set on the positive side and on the negative side, respectively, with respect to the reference voltage 411. Thus, it is possible to determine whether the pit section 301 of the address section AD which is passed over by the light beam is located on the outer periphery side or the inner periphery side with respect to the track center, based on the tracking error signal TE 303.

The outer periphery side address polarity determination signal 409 is produced by the comparator 403 and the monostable multivibrator 405. The inner periphery side address polarity determination signal 410 is produced by the comparator 406 and the monostable multivibrator 408. Note that the present invention is not limited to the above-described method for producing the address polarity determination signals.

An address reproduction circuit 52 (FIG. 1) reproduces addresses which are recorded in the pit sections 301 of the address section AD on the optical disk 12. An address may be reproduced by performing appropriate signal processing; e.g., digitizing a signal obtained as the light beam 19 passes over the pit section 301 into a pulse train and then decoding the pulse train.

The address section AD may also be referred to as a CAPA (complementary allocated pit address). The outer periphery side address polarity determination signal 409 is also designated "CPDT1", and the inner periphery side address polarity determination signal 410 is also designated "CPDT2" hereinbelow.

The address reproduction circuit 52 reproduces an address which is recorded in the pit section 301 based on the output from the differential amplifier 24. An address polarity determination circuit 51 produces an address polarity determination signal as described above based on the output from the differential amplifier 24.

An address confirmation circuit 53 confirms the address of the track being scanned by the light beam 19 based on the address polarity determination signals CPDT1 and CPDT2 and the output from the address reproduction circuit 52.

When all (both) of the addresses on the opposite sides of a track can successively be reproduced, the address confirmation circuit 53 determines whether the track currently being scanned by the light beam 19 is a land or a groove based on the reproduced addresses and the order in which they are reproduced.

Figure 4A:
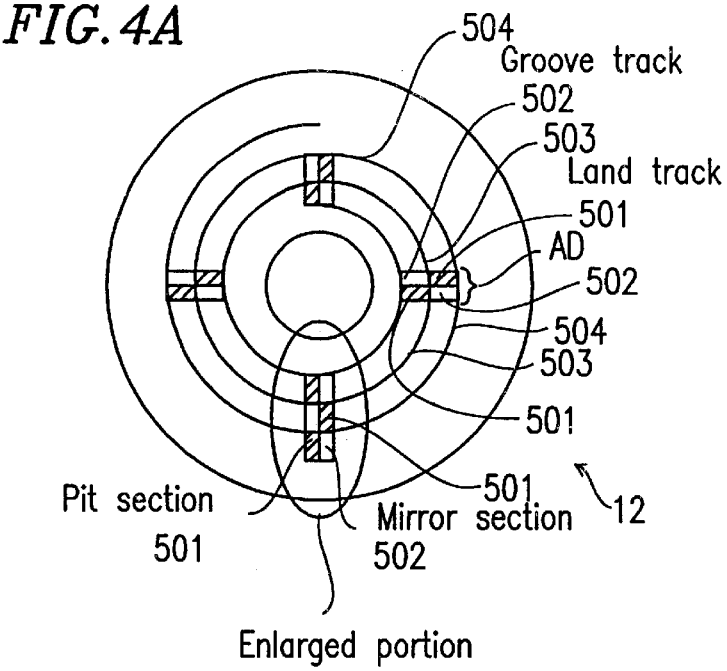
FIG. 4A is a schematic diagram illustrating an arrangement of an address section and a data section on an information carrier according to Example 1 of the present invention.
Figure 4B:
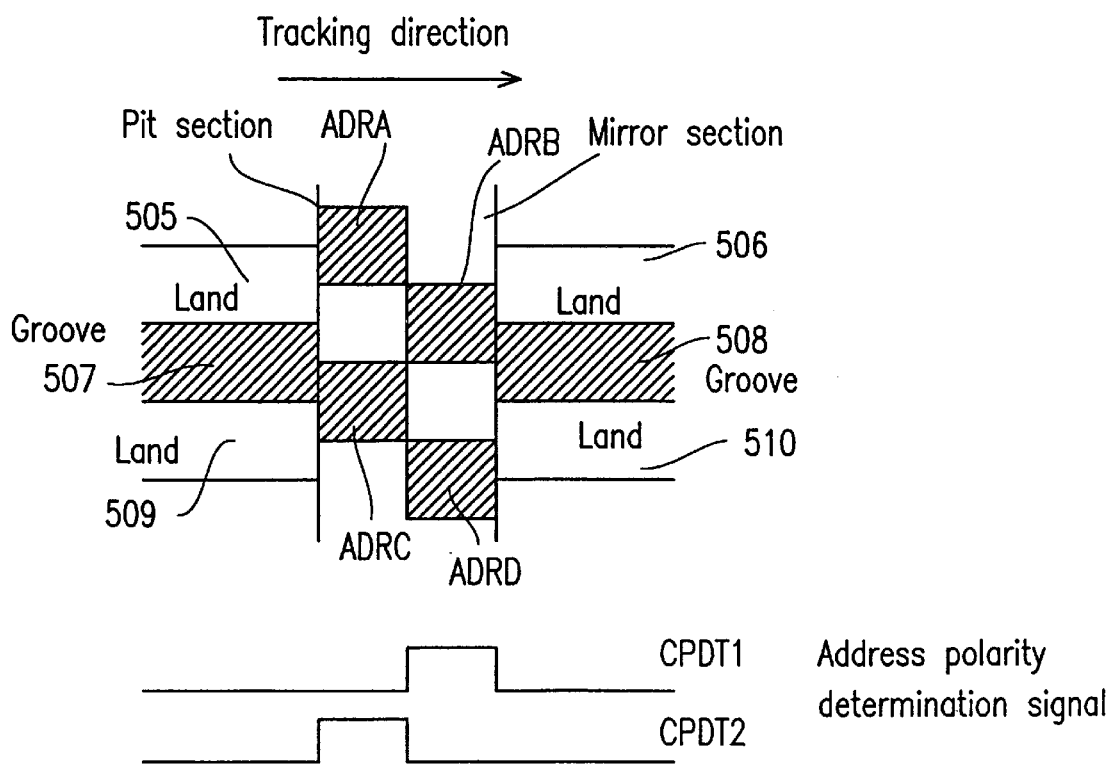
FIG. 4B is a schematic diagram illustrating the relationship between the arrangement of an address section and a data seat an and an address polarity determination signal.

FIG. 4A is a diagram illustrating the positional relationship between the address sections and the data sections arranged on the optical disk 12. FIG. 4B is a diagram illustrating the relationship between the address polarity determination signals and the address and data sections on the optical disk 12. The relationship between the address polarity determination signals and the address and data sections on the optical disk 12 will be described below with reference to FIGS. 4A and 4B.

As described above, a pair of a land track 503 and a groove track 504 runs in a spiral pattern across the optical disk 12, as illustrated in FIG. 4A. Each address region AD is located along a boundary between the land track 503 and the groove track 504. The address region AD includes pit sections 501 and mirror sections 502 which are wobbled about the track.

A boundary between the mirror section 502 and the pit section 501 which are wobbled about the track corresponds to the track center. As the light bean 19 moves from a land 505 to a land 506, the track address is determined by address information obtained from an address pit section ADRA and an address pit section ADRB.

The address of the land 506 is determined upon reproducing the address pit section ADRA and the address pit section ADRB in this order. The address of a groove 508 is determined upon reproducing address pit section ADRC and the address pit section ADRB in this order.

When both of the address pit section ADRA and the address pit section ADRB are successfully reproduced, the current position of the light beam 19 can be confirmed. However, when only one of the address pit section ADRA and the address pit section ADRB is successfully reproduced, the current position of the light beam 19 cannot be identified.

In particular, in reproducing/recording information from/to the land 506 in the data section, where the address information (address pit section) corresponding to the land 506 in the data section is the address pit section ADRA, the position of the light beam 19 is identified by reproducing both the address pit section ADRA and the address pit section ADRB, thereby allowing for an information reproducing/recording operation from/to the optical disk 12.

The address information may not successfully be obtained when there is a speck of dust or a scratch on the optical disk 12, or when a lens shift occurs due to eccentricity of the disk 12 or an externally applied shock.

In the following, a case where the light beam 19 moves from the land 505 to the address pit section ADRA, to the address pit section ADRB and then to the land 506 will be discussed, as well as a case where the light beam 19 moves from a groove 507 to the address pit section ADRC, to the address pit section ADRB and then to the groove 508.

Herein, assume that the light beam 19 passes over from the land 505 to the land 506 while failing to reproduce the address pit section ADRA and successfully reproducing only the address pit section ADRB. Alternatively, assume that the light beam 19 passes over from the groove 507 to the groove 508 while failing to reproduce the address pit section ADRC and successfully reproducing only the address pit section ADRD.

In either case, it is not possible to determine whether the light beam 19 is scanning the land 505 or the groove 507 based only on the obtained address information. This is because it is not possible in either case to determine whether the light beam 19 has passed on the outer periphery side or the inner periphery side of the address pit section ADRB.

In view of this, the optical disk apparatus 100 of this example references an address polarity determination signal which is output as the light beam 19 passes over the address pit section ADRB.

It is determined that the light beam 19 is moving from the land 505 to the land 506 if the address pit section ADRD has been reproduced while an outer periphery side address polarity determination signal 515 is output.

On the other hand, it is determined that the light beam 19 is moving from the groove 507 to the groove 508 if the address pit section ADRB has been reproduced while an inner periphery side address polarity determination signal 516 is output.

Thus, with the reference to the address polarity determination signal 515 or 516, it is possible to confirm the address of the address section as long as one of the wobbled address pit sections is successfully reproduced.

When the address reproduction circuit 52 successfully reproduces both of the wobbled address pit sections, a central processing unit (CPU) 54, or the like, may use the output result from the address confirmation circuit 53 as it is.

On the other hand, when the address reproduction circuit 52 successfully reproduces only one of the wobbled address pit sections, the CPU 54, or the like, may control the address confirmation circuit 53 to reference the address polarity determination signal 515 or 516.

As described above, according to this example of the present invention, even when only one of the address pit sections is successfully reproduced, it is possible to confirm the track currently being scanned by the light beam based on the address polarity determination signal, and thus to successively reproduce/record data from/to the data section along the track.

EXAMPLE 2

Example 2 of the present invention will be described with reference to FIGS. 5 to 8B.

Figure 5:
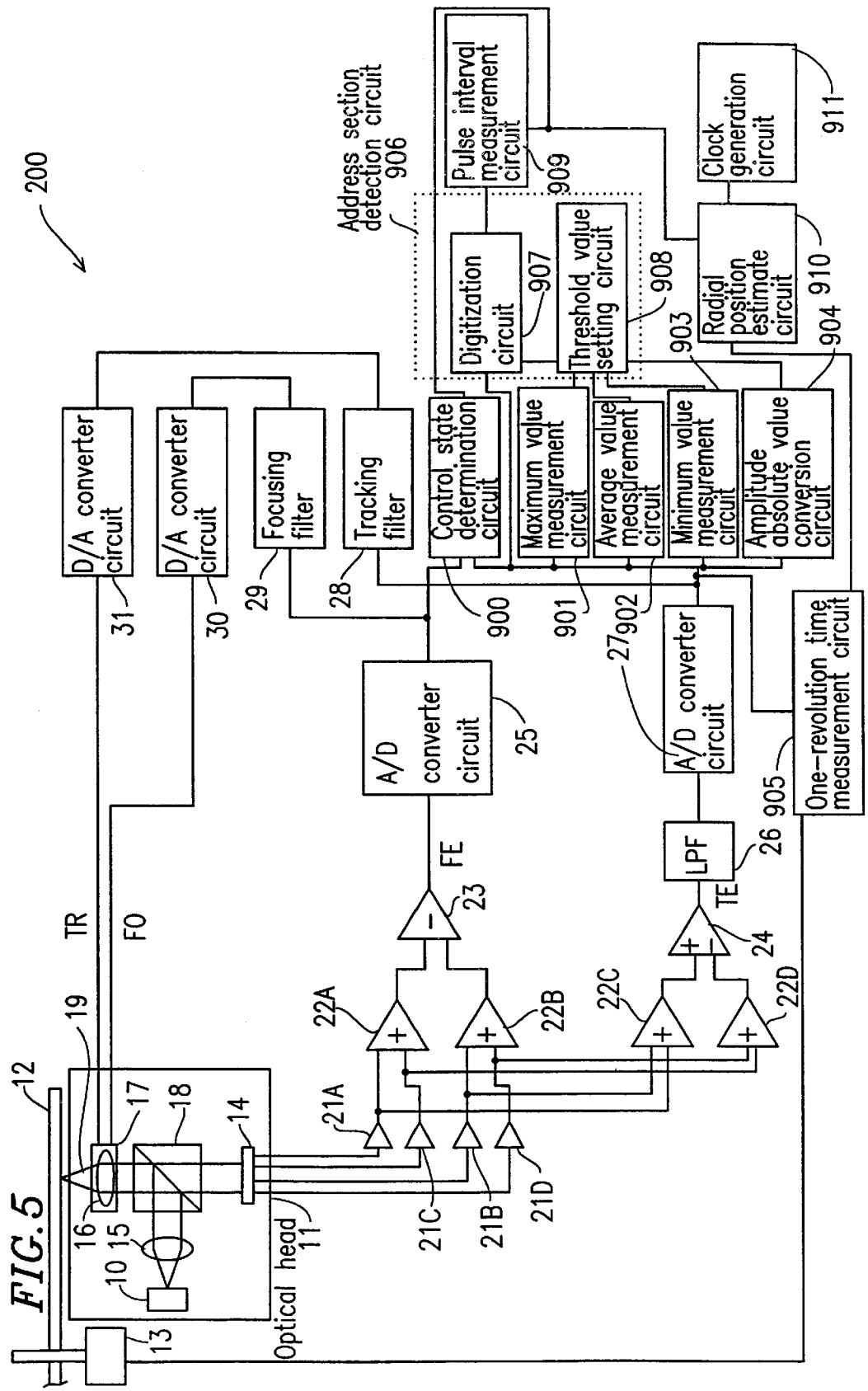
FIG. 5 is a block diagram illustrating an optical disk apparatus according to Example 2 of the present invention.

FIG. 5 is a block diagram illustrating an optical disk apparatus 200 according to Example 2 of the present invention. The focusing control and the tracking control are substantially the same as those described in Example 1, and thus will not further be described below.

Figure 6:
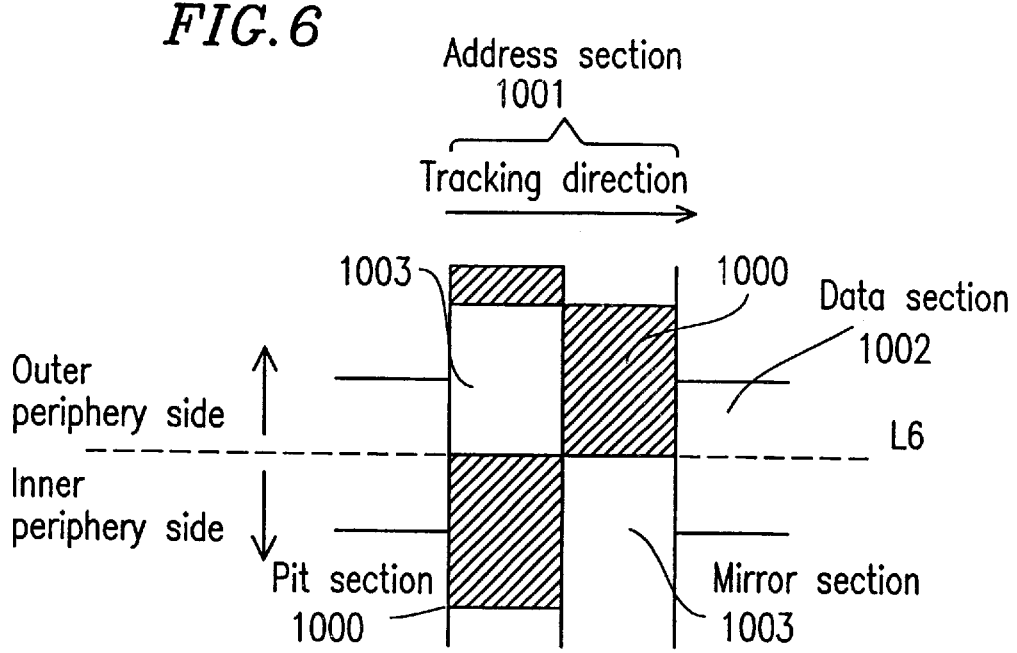
FIG. 6 is a schematic diagram illustrating the relationship between an address section and an address polarity determination signal.
Figure 6:
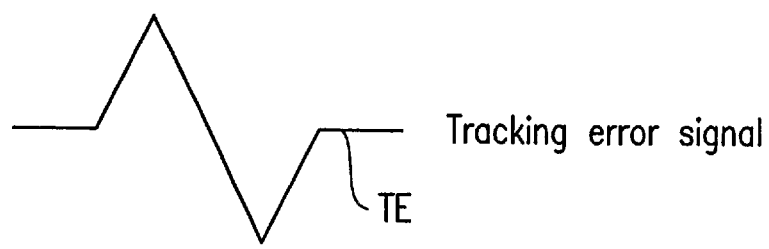
Figure 6:
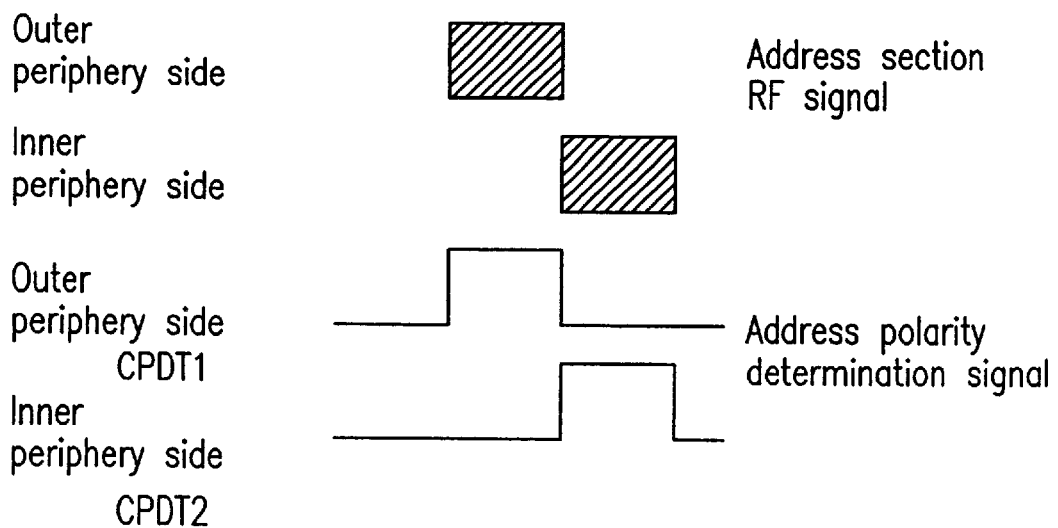

FIG. 6 illustrates the relationship among the address section arrangement, the tracking error signal TE, the address section RF signal and the address polarity determination signal.

Referring to FIG. 5, the focusing error signal FE and the tracking error signal TE are input to a control state determination circuit 900 for determining the current state of the focusing control and the tracking control.

The control state determination circuit 900 detects an out-of-focus state when it determines that the focusing error signal FE is equal to or greater than a predetermined value. Moreover, the control state determination circuit 900 detects an unstable tracking control when it determines that the tracking error signal TE is equal to or greater than a predetermined value or that the light beam has shifted across a number of tracks equal to or greater than a predetermined number. Particularly, a circuit for determining whether the light beam has shifted across a number of tracks equal to or greater than a predetermined number is called a "abnormal track jump detection circuit" and is used to check if a tracking pull-in operation has been achieved after a seek operation.

As illustrated in FIG. 6, an address section 1001 recorded by concave/convex pits includes a mirror section 1003 and a concave/convex pit section 1000. The light beam 19 moves in the track direction along a boundary L6 between the mirror section 1003 and the concave/convex pit section 1000. Then, the tracking error signal TE is obtained as an output from low pass filter 26 (FIG. 5). The tracking error signal TE has an S- or zigzag-shape waveform as illustrated in FIG. 6.

Referring to FIG. 5, the tracking error signal TE output from the low pass filter 26 passes through the A/D converter circuit 27 and then is input to the following circuits: the control state determination circuit 900; a maximum value measurement circuit 900 for measuring a maximum value (VMAX) of the tracking error signal TE for a predetermined period of time: a minimum value measurement circuit 903 for measuring a minimum value (VMIN) of the tracking error signal TE for a predetermined period of time; an average value measurement circuit 902 for measuring an average value (VAVE) of the tracking error signal TE for a predetermined period of time; an amplitude absolute value conversion circuit 904 for converting the tracking error signal TE to an absolute value signal at a predetermined level; and a digitization circuit 907 for digitizing the tracking error signal TE using a threshold value obtained by a threshold value setting circuit 908.

An address section detection circuit 906 includes the digitization circuit 907 and the threshold value setting circuit 908.

FIG. 7A illustrates the relationship among the tracking error signal TE, a maximum value 1101, an average value 1103, a reference voltage (VREF) 1110, a minimum value 1104 and an address section detection signal 1105 for indicating the presence of an address section.

As illustrated in FIG. 7A, the tracking error signal TE is digitized by the digitization circuit 907 using a threshold value 1102 so as to obtain a pulse signal which is used as the address section detection signal 1105.

Ideally, the tracking error signal TE symmetrically extends toward the positive side and toward the negative side about the reference voltage 1110 as illustrated in FIG. 7A. While the reference voltage 1110 as used herein corresponds to a tracking control target voltage, the reference voltage 1110 coincides with the average value (VAVE) 1103 of the tracking error signal TE.

The tracking error signal TE may, in some cases, be asymmetrical about the reference voltage 1110 due to a lens shift or the optical characteristic of the optical head used. In such a case, the threshold value 1102 for the digitization circuit 907 may need to be appropriately adjusted.

A method for appropriately setting the threshold value 1102 using the maximum value 1101 and the minimum value 1104 of the tracking error signal TE will be described below.

Where the light beam 19 is located along the track center and there is no disturbance such as a lens shift, the threshold value 1102 may be set as follows so that the influence from the fluctuation in the tracking error signal TE is reduced.

Referring to FIG. 7A, the threshold value 1102 may be set so as to divide the difference (VPD) 1107 between the maximum value 1101 and the reference voltage 1110 at a predetermined ratio. For example, when the predetermined ratio is m:n, the threshold value 1102 can be calculated by Expression 1 below:

VTH 1102=(m×VMAX 1101+n×VREF 1110)/(m+n).(Expression 1)

Referring to FIG. 7B, the threshold value 1102 may alternatively be set so as to divide the difference between the maximum value 1101 and the minimum value 1104 at a predetermined ratio. For example, when the predetermined ratio is m:n, the threshold value 1102 can be calculated by Expression 2 below:

VTH 1102=(m×VMAX 1101+n×VMIN 1104)/(m+n)(Expression 2)

Referring to FIG. 7C, the threshold value 1102 may alternatively be set so as to divide the difference (VMD) 1108 between the reference voltage 1110 and the minimum value 1104 at a predetermined ratio. For example, when the predetermined ratio is m:n, the threshold value 1102 can be calculated by Expression 3 below:

VTH 1102=(m×VREF 1110+n×VMIN 1104)/(m+n). (Expression 3)

Whether the threshold value 1102 should be set on the positive side or the negative side with respect to the reference voltage 1110 may be determined based on the difference (VPD) 1107 between the maximum value 1101 and the reference voltage 1110 and the difference (VMD) 1108 between the minimum value 1104 and the reference voltage 1110.

When the difference (VPD) 1107 is greater than the difference (VMD) 1108, the threshold value 1102 is preferably set on the positive side. When the difference (VMD) 1108 is greater than the difference (VPD) 1107, the threshold value 1102 is preferably set on the negative side. Thus, it is possible to more accurately detect an address section.

Where the maximum value 1101, the minimum value 1104 and the average value 1103 of the tracking error signal TE for a predetermined period of time are used, the threshold value 1102 can be set using the average value 1103 instead of the reference voltage 1110.

In particular, whether the threshold value 1102 should be set on the positive side or the negative side with respect to the reference voltage 1110 may be determined based on the difference (VPD) 1107 between the maximum value 1101 and the average value 1103 and the difference (VMD) 1108 between the minimum value 1104 and average value 1103.

When the difference (VPD) 1107 is greater than the difference (VMD) 1108, the threshold value 1102 is preferably set on the positive side. When the difference (VMD) 1108 is greater than the difference (VPD) 1107, the threshold value 1102 is preferably set on the negative side. Thus, it is possible to more accurately detect an address section.

A threshold value setting operation based on the amplitude absolute value conversion circuit 904 (FIG. 5) will be described below with reference to FIGS. 8A and 8B. When the tracking error signal TE fluctuates, as illustrated in FIG. 8A, due to eccentricity of the optical disk, or the like, the accuracy for measuring the maximum and minimum values decreases. Thus, an address section may not be detected even if the threshold value 1102 (FIGS. 7A to 7C) is set.

In view of this, the tracking error signal TE is converted to a signal representing the absolute value of the amplitude of the tracking error signal TE based on a reference voltage 1203, as illustrated in FIG. 8B.

After the amplitude absolute value conversion, a threshold value 1200 is set in a manner as described above with reference to FIGS. 7A to 7C. Thus, an address section can successfully be detected.

Alternatively, after the amplitude absolute value conversion, a maximum value 1202 of the tracking error signal TE may be measured so as to set a threshold value 1200, as illustrated in FIG. 8B. Based on the threshold value 1200, the digitization circuit 907 outputs the pulsed address section detection signal 1105.

The address section detection signal 1105 may be input to a pulse interval measurement circuit 909 for measuring the pulse interval so as to measure the time interval between an input pulse and the next pulse, thereby obtaining an address interval information (CPTIME) 1106 as illustrated in FIGS. 7A to 7C. The address interval measurement operation terminates upon obtaining the address interval information 1106.

Next, the address interval information 1106 is input to a radial position estimate circuit 910 for estimating the radial position of the light beam 19 with respect to the optical disk 12.

A regular pulse according to the number of revolutions of a spindle motor, e.g., a number of pulse shots (FG) for controlling the frequency of the motor, is input to the radial position estimate circuit 910 via a one-revolution time measurement circuit 905. Based on the pulse signal, the period of time required for one revolution of the optical disk 12 can be determined.

When the optical disk 12 includes address sections and data sections and is divided into a plurality of zones, the number of address sections which are recorded at regular intervals along a single round of track varies for different zones. Moreover, since there is no substantial rotational unevenness during each revolution of the optical disk 12, there is no substantial variation in time for one revolution of the optical disk 12. As a light beam is scanning along a track at a particular radial position, the address sections being passed over by the light beam are arranged at regular intervals. When the optical disk 12 is rotating at a constant linear velocity, the time interval between address sections varies for different radial positions on the optical disk 12 of the track being scanned by the light beam 19.

Thus, it is possible to estimate the current radial position of the light beam based on the pulse interval detected:for the address section and the one-revolution time of the optical disk.

The radial position information estimated by the radial position estimate circuit 910 is input to a clock generation circuit 911 for generating a reference signal according to the linear velocity of the light beam with respect to the optical disk. The clock generation circuit 911 outputs a reference clock signal according to the linear velocity of the light beam, sets the target number of motor revolutions, and corrects a predetermined PLL pull-in range linear velocity. Thus, it is possible to pull-in PLL so as to successively reproduce an address.

As described above, in a normal state, it is possible to estimate the radial position of the disk based on the pulses obtained for the address section, and to set the clock according to the radial position of the track being scanned by the light beam. However, it may not be possible to successfully reproduce an address during a seek operation or when the light beam is unfocused by an externally applied shock. In such a case, it is necessary to reproduce the address by setting the clock and pulling-in PLL again.

The clock setting operation and the PLL pull-in operation based on the address interval measurement will be described below.

Since the address interval measurement is based on the tracking error signal TE, the measurement operation can properly be performed even if the clock does not correspond to the linear velocity of the light beam. However, the measurement operation may malfunction when the tracking control and/or the focusing control are/is unstable.

Where the address cannot be reproduced, if the focusing control and the tracking control are both unstable, an appropriate clock can be set by initiating the address interval measurement operation, measuring the maximum value, the minimum value and the average value of the tracking error signal TE, setting a threshold value based on the obtained values, digitizing the tracking error signal TE, measuring the pulse interval based on an output pulse, and estimating the radial position based on the pulse interval.

When an address interval is measured when the tracking control is unstable, erroneous address interval information may be obtained because the tracking error signal substantially fluctuates.

Such an erroneous setting can be avoided by not initiating the address interval measurement operation. Alternatively, when the tracking control becomes unstable while measuring the maximum value, the minimum value and the average value of the tracking error signal TE, the obtained address interval information may be ignored (e.g., by not using it).

Similarly, when the focusing control becomes unstable, erroneous address interval information may be obtained. Such an erroneous setting can be avoided by not initiating the address interval measurement operation. Alternatively, when the focusing control becomes unstable while measuring the maximum value, the minimum value and the average value of the tracking error signal TE, the obtained address interval information may be ignored (e.g. by not using it).

Thus, it is possible to more accurately measure the address interval. Moreover, it is possible to more accurately estimate the radial position of the track being scanned by the light beam so as to output an optimal reference clock and set a target number of motor revolutions, thereby successfully pulling-in PLL again and successfully reproducing/recording information from/to the optical disk 12.

EXAMPLE 3

Example 3 of the present invention will be described with reference to FIGS. 9 and 10.

The focusing control and the tracking control are substantially the same as those described in Example 1, and elements in FIG. 9 having like reference numerals to those which have already been discussed above will not further be described.

The generation of the address section detection signal using the tracking error signal TE, the maximum value measurement circuit 901, the minimum value measurement circuit 903, the average value measurement circuit 902 and the amplitude absolute value conversion circuit 904 is substantially the same as that described in Example 2 above, and thus will not further be described.

As illustrated in FIG. 9, the focusing error signal FE and the tracking error signal TE are input to the control state determination circuit 900 for determining the current state of the focusing control and the tracking control.

Pulses output from the address section detection circuit 906 are input to a pulse counter circuit 1300 for counting the number of pulses which are input thereto for a predetermined period of time.

The output of the pulse counter circuit 1300 is input, as address number information, to the radial position estimate circuit 910 for estimating the radial position of the light beam 19 with respect to the optical disk 12. A regular pulse according to the number of revolutions of a spindle motor 13, e.g., a number of pulse shots (FG) for controlling the frequency of the motor, is input to the radial position estimate circuit 910 via a one-revolution time measurement circuit 905. Based on the pulse signal, the period of time required for one revolution of the optical disk 12 can be determined.

When the optical disk 12 includes address sections and data sections and is divided into a plurality of zones, the number of address sections which are recorded at regular intervals along a single round of track varies for different zones. Moreover, there is no substantial variation in time for one revolution of the optical disk 12.

Therefore, the number of addresses detected during one revolution of the disk may vary for different radial positions of the track being scanned by the light beam 19.

Thus, it is possible to estimate the radial position of the track currently being scanned by the light beam based on the number of pulses detected for the address section during one revolution of the optical disk and the one-revolution time of the optical disk.

Moreover, one revolution of the optical disk can be detected by measuring the output pulse from the spindle motor 13, as described above, or it may alternatively be detected based on the pattern of the tracking error signal TE.

A method for detecting one revolution of the optical disk based on the tracking error signal TE will be described below with reference to FIG. 10.

Where the optical disk 12 is divided by address sections and data sections, and the address sections are wobbled about a track, an described above in Example 1, the light beam 19 passes a land/groove switch section for each revolution of the optical disk 12 as the light beam 19 tracks along a track.

Thus, it is possible to detect one revolution of the optical disk 12 based on when the inversion of the polarity of the tracking error signal TE which is output as the light beam passes over the wobbled address sections, or the inversion of the order of the address polarity determination signals.

Referring to FIG. 10, when the light beam 19 scans along a land, address polarity determination signals 1402 and 1403 are output in this order for address sections 1404, 1405 and 1406.

On the other hand, for address sections 1407 and 1408, the address polarity determination signal 1403 and 1402 are output in this reverse order. Thus, it is possible to determine that the light beam 19 is currently scanning along a groove region.

Thus, it is possible to detect one revolution of the optical disk 12 and estimate the radial position of the light beam based on the inversion of the order of the address polarity determination signals 1402 and 1403.

The radial position information estimated by the radial position estimate circuit 910 is input to the clock generation circuit 911 for generating a reference signal according to the linear velocity of the light beam with respect to the optical disk. Then, the clock generation circuit 911 outputs a reference clock according to the linear velocity, sets a target number of revolutions for the motor 13, and corrects the linear velocity into a predetermined PLL pull-in range, thereby pulling-in PLL and successfully reproducing an address.

As described above, in a normal state, it is possible to estimate the radial position of the disk based on the pulses obtained for the address section, and to set the clock according to the radial position of the track being scanned by the light beam. However, it may not be possible to successfully reproduce an address during a seek operation or when the light beam is defocused by an externally applied shock. In such a case, it is necessary to reproduce the address by setting the clock and pulling-in PLL again.

The address count operation (for measuring the number of addresses), the clock setting operation and the PLL pull-in operation will be described below.

Since the address count operation is based on the tracking error signal TE, the address count operation can properly be performed even if the clock does not correspond to the linear velocity of the light beam. However, the address count operation may malfunction when the tracking control and/or the focusing control are/is unstable.

Where the address cannot be reproduced, if the focusing control and the tracking control are both unstable, an appropriate clock can be set by initiating the address count operation, measuring the maximum value, the minimum value and the average value of the tracking error signal TE, setting a threshold value based on the obtained values, digitizing the tracking error signal TE, measuring the number of pulses based on the output pulse signal, and estimating the radial position based on the number of pulses.

When the number of addresses is counted when the tracking control is unstable, erroneous address count information may be obtained because the tracking error signal substantially fluctuates.

Such an erroneous setting can be avoided by not initiating the address count operation. Alternatively, When the tracking control becomes unstable while measuring the maximum value, the minimum value and the average value of the tracking error signal TE, the obtained address interval information may be ignored (e.g., by not using it).

Similarly, when the focusing control is unstable, erroneous address count information may be obtained. Such an erroneous setting can be avoided by not initiating the address count operation. Alternatively, when the focusing control becomes unstable while measuring the maximum value, the minimum value and the average value of the tracking error signal TE, the obtained address count information may be ignored (e.g., by not using it).

Thus, it is possible to more accurately count the number of addresses. Moreover, it is possible to more accurately estimate the radial position of the track being scanned by the light beam so as to output an optimal reference clock and set a target number of motor revolutions, thereby successfully pulling-in PLL again and successfully reproducing/recording information from/to the optical disk 12.

As described above, according to the present invention, even when only one of the address pit sections is successfully reproduced, it is possible to confirm the track currently being scanned by the light beam by the use of the address polarity determination signal. Furthermore, it is possible to estimate the radial position of the track currently being scanned by the light beam, output a reference clock and obtain the address information by measuring the address interval based on the signals detected for the address section. Moreover, it is possible to estimate the radial position of the track currently being scanned by the light beam, output a reference clock and obtain the address information by counting the number of addresses based on the signals detected for the address section. Thus, the present invention can provide an inexpensive and reliable optical disk apparatus for reproducing/recording data from/to an optical disk.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk apparatus, comprising:

a light amount detection section for irradiating an information carrier with a light beam so as to detect information recorded in a data section of the information carrier, wherein the information carrier includes the data section and an address section associated with the data section, the data section is an information track formed by a land or a groove where information is recorded or reproduced, and the address section contains address information corresponding to the information track which is recorded in the address section by at least one concave or convex pit offset by a predetermined distance from a center of the information track;

an address polarity determination section for determining whether the address section over which the light beam has passed is either on an outer periphery side or on an inner periphery side with respect to the center of the information track being scanned by the light beam, based on a signal output from the light amount detection section;

an address reproduction section for reproducing the address information recorded in the address section based on a signal output from the light amount detection section; and an address confirmation section for confirming the data section from which or to which data is to be reproduced or recorded, based on the determination result from the address polarity determination section and the address information reproduced by the address reproduction section.

2. An optical disk apparatus according to claim 1, wherein:

the address section comprises a plurality of address regions where the address information is recorded;

the address regions are wobbled by a predetermined distance about the center of the information track; and the address region is shared by a pair of adjacent information tracks.

3. An optical disk apparatus according to claim 1, wherein the light amount detection section detects the information recorded on the information track based on the light beam having been reflected by the information carrier.

4. An optical disk apparatus according to claim 1, wherein the light amount detection section detects the information recorded on the information track based on the light beam having passed through the information carrier.

* * * * *